Aug. 31, 1937.  T. P. PREIST  2,091,491
SYNCHRONIZING SYSTEM
Filed May 18, 1935  4 Sheets-Sheet 3
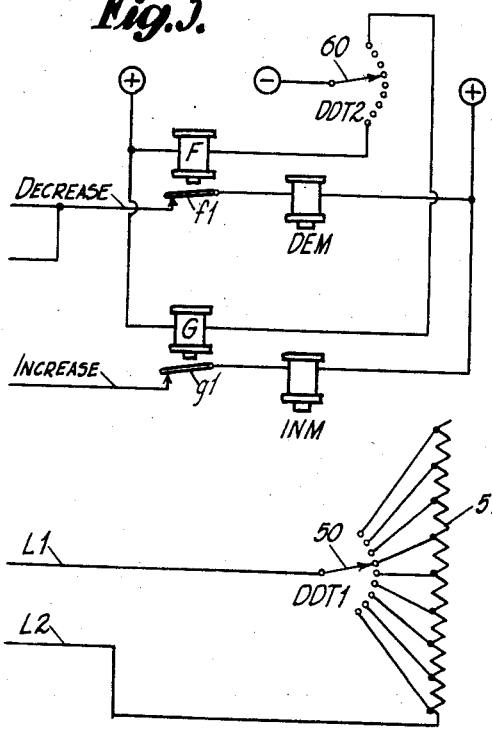
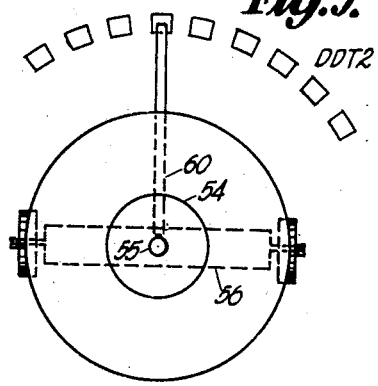
INVENTOR
Thomas Philip Preist
BY Edwards Bower & Pool
ATTORNEYS

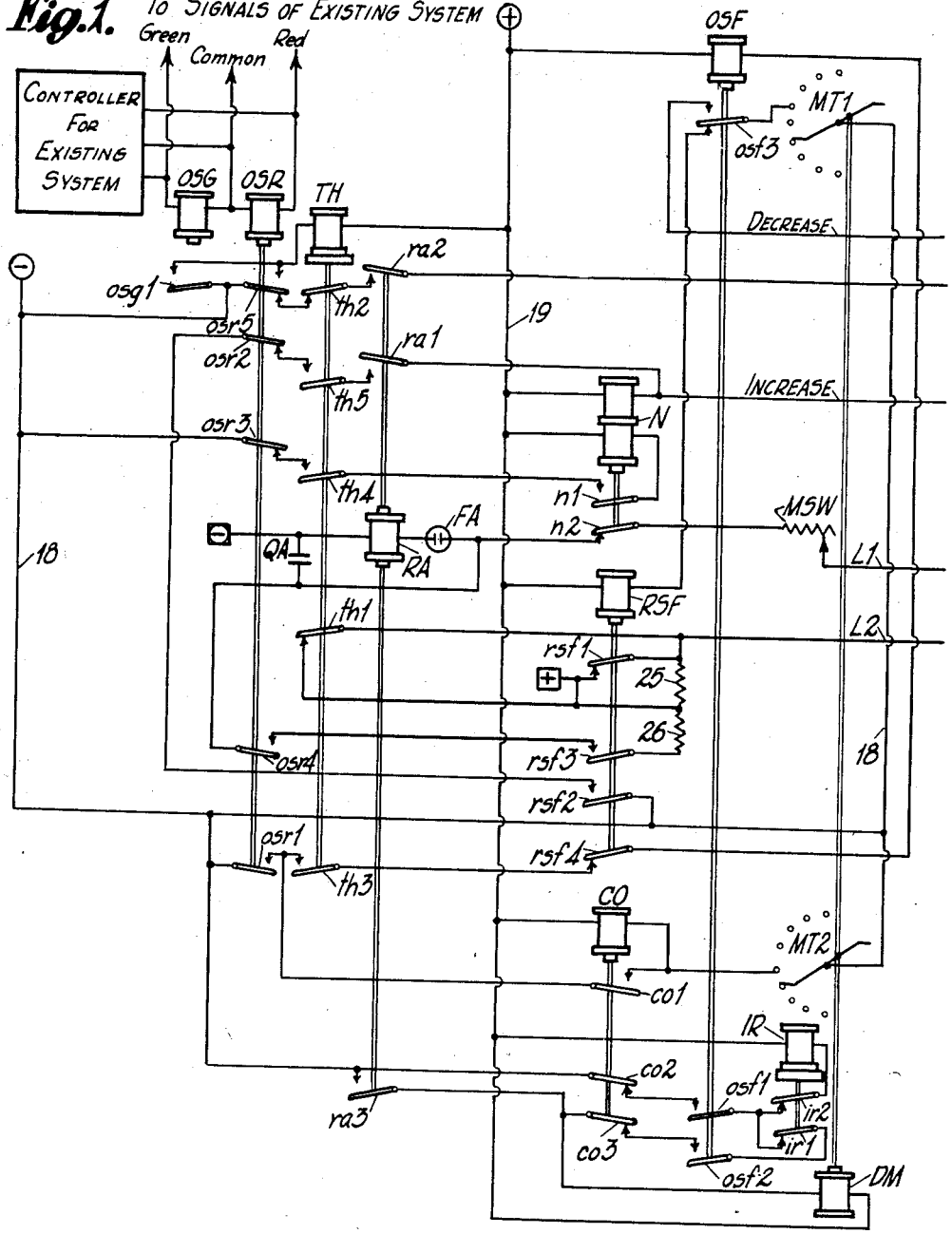

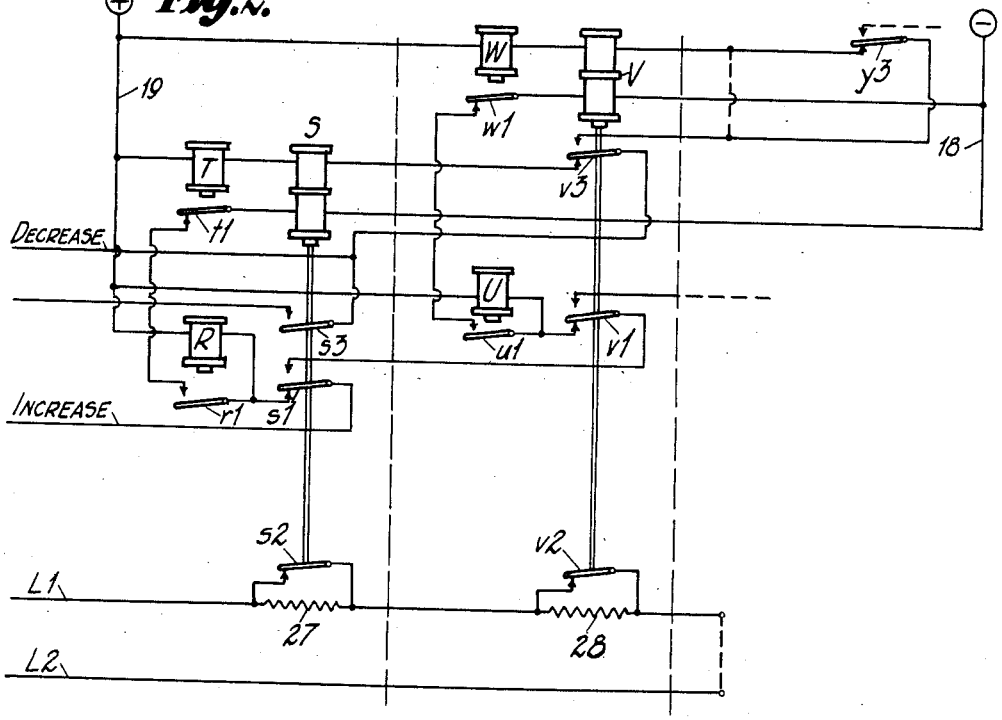
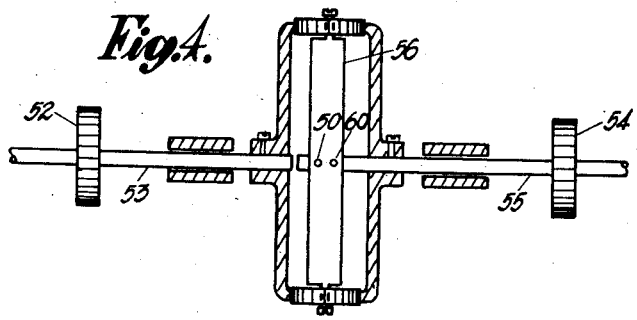

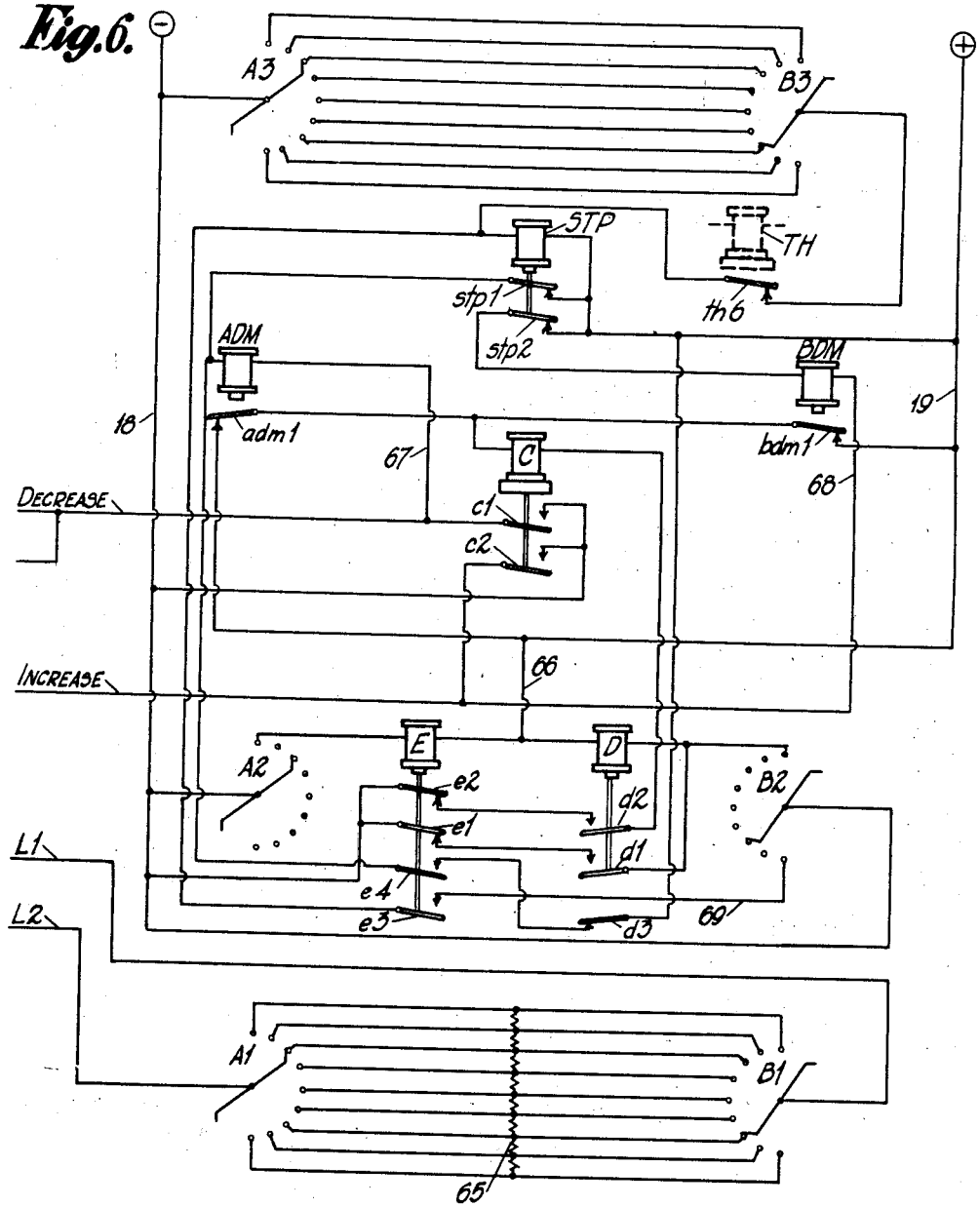

Patented Aug. 31, 1937

2,091,491

UNITED STATES PATENT OFFICE 2,091,491

SYNCHRONIZING SYSTEM

Thomas Philip Preist, Wallasey, England, assignor, by mesne assignments, to Automatic Telephone & Electric Company Limited, London, England Application May 18, 1935, Serial No. 22,204
In Great Britain May 28, 1934

13 Claims. (Cl. 172—293)

The present invention relates to traffic control signals and is more particularly concerned with systems employing a plurality of sets of signals controlled by common apparatus located at a distant point. The chief object of the invention is the provision of additional facilities whereby a system of this type is enabled to co-operate with an adjacent system which may already be installed and operating.

According to the invention the common apparatus or so-called master controller which controls the signal changes at the several intersections controlled by the newly installed system is adapted either to operate independently or to adjust its cycle time automatically so as to keep in phase with an adjacent system, which may have a cycle of varying length such as is common with traffic actuated traffic control systems.

For convenience of description the system assumed to be already operating will be termed the existing system and the system controlled thereby in accordance with the invention will be termed the new system. The invention will be better understood from the following description of one method of carrying it into effect, reference being had to the accompanying drawings and in which:

Figure 1 is a diagram showing the controlling relays for automatically adjusting the cycle time of the master controller of the new system, and showing also a portion of the master controller.

Figure 2 represents groups of serially operated relays which when connected to the apparatus of Figure 1 in the manner indicated vary the resistance in the timing circuit of the master control for effecting the change in cycle length.

Figure 3 shows apparatus for an alternate method of varying the resistance in the timing circuit and in which a rotary stepping switch having wipers rotatable in either direction by means of a differential gearing is utilized in lieu of the relay groups of Figure 2.

Figures 4 and 5 are each sectional views of a conventional differential gearing arrangement, utilized in the rotary stepping switch of Figure 3, having dual stepping magnets and ratchet apparatus for producing movement of the wiper arms either clockwise or counterclockwise.

Figure 6 shows another alternative arrangement for effecting variation in the resistance of the master controller timing circuit in which a pair of conventional rotary stepping switches perform this function under the control of the relays of Figure 1.

Signals at the intersections governed by the new system are controlled from a master controller through local relays or local controllers at the several intersections and are thereby maintained in a definite phase relationship with one another. When operating independently of the existing system, for instance, the master controller operates thru a cycle of signal indications whose length is determined by a timer associated with the master controller. The master controller may employ a condenser-gas discharge tube timing arrangement for generating periodic impulses to operate a rotary stepping switch thru successive positions on a group of contact banks. Some of the banks may be employed to provide connections to the local controllers for controlling the progress of the local controllers or change of signal indications by them at predetermined points in the cycle of the master controller, and certain other banks of the master controller, banks MT1 and MT2 in Fig. 1 in the present instance, may be employed for the interlinking arrangement provided for by the invention, as shown for example in the British Patent No. 403,720 to Automatic Electric Company, Limited and Percy Bailey Renshaw, and in the corresponding co-pending U. S. application S. N. 677,029.

Certain features of the present application, such as increasing and decreasing of the time cycle of the secondary timer by means of a two-way adjusting switch in accordance with the relative time length of a primary timer cycle and the secondary timer cycle, are disclosed in co-pending application Serial Number 140,873, filed May 5, 1937, by A. P. B. Renshaw as a division of co-pending application Serial Number 2,480, filed January 19, 1935, by A. P. B. Renshaw, the two co-pending applications having a common assignee with the present application. No claims are made in the present application to such subject matter as is common with the co-pending applications, such common subject matter being claimed in the co-pending Renshaw application Serial Number 140,873.

For interlinking of the new system with the existing system, according to the invention, a position in the cycles of both the new and existing systems is chosen from which it is desired that both systems will start thru their cycles at approximately the same time. If the new system completes its cycle before the existing system, relays are operated causing the master controller of the new system to pause until the existing system catches up, and apparatus is also operated for introducing additional resistance into the operating circuit of the condenser-discharge tube timer in the master controller of the new system for lengthening its succeeding cycle. Conversely, if the existing system completes its cycle first, relays removing resistance from the master controller timer of the new system are operated, and an automatic drive speeds the master controller thru the remainder of its cycle.

Referring now to Figs. 1 and 2 in combination, contact with the existing system is established by means of relay OSG and OSR which are connected in parallel with the green and red signals of a particular set in the existing system. As long as this system is working, these relays are operated alternately and each serves to energize the thermostat relay TH which is sufficiently slow in releasing to overlap the amber signal period when neither relay OSG nor OSR is operated if this condition arises. Relay TH may be of any appropriate time delay type, as for example, the well-known motor driven gear type or the familiar dashpot type, or as indicated in this embodiment, may be a bi-metallic strip heated by electric current. As used herein it is of the time delayed release type.

If the existing system is out of service, for instance, at night, the thermostat relay TH will not be operated so that the various control relays remain de-energized and the resistance in the timing circuit comprising the discharge tube FA, relay RA and condenser QA is controlled by the manual adjusting switch MSW alone since resistances 25, 26, 27 and 28 are shunted under these conditions. Owing to the comparatively high flash voltage of the discharge tube, the timing circuit is energized from a source of current supply preferably higher than that serving the relays and stepping switch, and this is available at the terminals marked positive in a rectangle and negative in a circle and a rectangle. The manual switch MSW is set so as to cause the condenser to be charged fairly quickly whereupon relay RA operates and energizes the driving magnet DM which advances the wipers of the master timer switch MT over their bank contacts. Although only two banks, MT1, MT2 of this switch are shown in the drawings, it will be understood that it is provided with other banks which connect with the various sets of signals of the new system to control their operation in progressive relationship, for instance, in the general manner outlined above, and as particularly exemplified in the U. S. application S. N. 677,029 to Renshaw and corresponding British Patent 403,720 aforesaid. In this prior application and patent such "other" banks of the master timer switch are indicated in Fig. 1 at 1a, 2a, and 3a, these banks being connected to corresponding relay groups as indicated at 1B, 1C, etc. in the dotted line rectangle in Fig. 1 for bank 1a for one intersection and as shown in detail with signals, etc. in Fig. 2 for bank 2a for example for another intersection. The stepping magnet DSM in Fig. 1 of the prior application S. N. 677,029 corresponds to magnet DM in Fig. 1 of the present application, and magnet DSM in the prior application is periodically operated at short intervals by action of the condenser-discharge tube timer employing (see Fig. 1) condenser QB and tube N, which correspond to condenser QA and tube FA of Fig. 1 of the present application.

While the existing system is out of service with the adjusting switch MSW in low resistance position as above mentioned, the switch MT is stepped ahead comparatively quickly at periodic intervals and the new system operates on a short cycle time. Relays RSF and CO are connected respectively to the two banks MT1 and MT2 of the master timer in what will be termed the phasing position in relation to the existing system. This phasing position of the new system comprises two successive bank contact positions, with relay RSF connected to one contact position on bank MT1 and relay CO connected to the next position on bank MT2. These relays are operated as the wipers move past those contacts but their operation is without effect while the existing system is out of service. The phasing position of the existing system in this instance is controlled by relay OSR which operates at the commencement of the display of the red signal by the existing system, although it will be appreciated that relay OSG would serve equally well since the phasing position of the new system is chosen arbitrarily in any case. It will be understood that the actual difference of phase selected is dependent upon the distance of travel of traffic between the two systems and also upon the average speed of the traffic.

When the existing system is connected in service, the thermostat relay TH is energized from wires 18 and 19 over contacts osg1 or osr5, and if it is assumed that at the instant of switching on, the end of the cycle of the existing system is later than that of the new system, relay RSF will be energized, from wires 18 and 19 over the wiper of bank MT1 when the wiper is in the phasing position and over armature osf3 in the de-energized position of relay OSF, before relay OSR is energized. By energization of relay RSF an additional resistance 25 is included at armature rsf1 in the charging circuit for the timer. This has the effect of introducing a slight pause in the stepping of the master timer switch but if the cycles are very much out of phase, relay RA will again operate after the pause introduced by added resistance 25 has elapsed and at armature ra1 completes a circuit over armature rsf2, osr2 and th5 for operating one of the dual coils of relay N. At the same time grounded lead 18 is connected to what will be termed the "increase" lead over the same circuit and operates relay R in the resistance control group Fig. 2. Relay N locks over its second winding and at armature n2 opens the charging circuit of the condenser QA to stop the operation of the master timer. When relay RA releases after the condenser QA has discharged, relay R is maintained energized over armature r1 and armature t1 in series with relay S which also operates by the breaking of the shunting connection from grounded power over the "increase" lead via armatures s1, r1, t1, across the coil of relay S at armature ra1, and at armature s2 an additional resistance 27 is inserted in the charging circuit for the timer. Thus relay R on operation prepares a locking circuit for itself over armature r1 in series with relay S, the locking circuit becoming effective when the original energizing circuit for relay R over armature s1 and the "increase" lead to grounded power is broken by operation of armature ra1, at which time relay S operates. In addition, upon the release of relay RA the master timer switch steps to the next position where relay RSF releases and where relay CO, which is connected to the next adjacent set of contacts, operates.

The master timer now waits until the existing system has completed its cycle, whereupon relay OSR operates and over armatures osr1, th3 and

*rsf*4, energizes relay OSF which is, however, without effect since relay CO is operated and circuit over MT1 is open at this time. Relay OSR in addition, at armature *osr*3 opens the holding circuit of relay N which releases and at armature *n*2 again connects up the timing circuit so that the two systems start the next cycle approximately in phase.

If at the end of the next cycle the existing system is again behind, relay RSF will again operate before relay OSR introducing a pause in the master timer operation. If this pause is not sufficient to allow the existing system to catch up, relay RA will again operate to energize relay N, this time in parallel with relay U (instead of relay R) over the "increase" lead and armatures *s*1 and *v*1 so that when relay RA releases, relay U is maintained energized over its armature *u*1 and via armature *w*1 in series with relay V, which is energized by the breaking, at armature *ra*1, of the shunt connection by armatures *s*1, *v*1, *u*1 and *w*1 across the coil of relay V and as a result at armature *v*2 an additional resistance 28 is inserted in the charging circuit. When relay OSR eventually operates, at armature *osr*3 it opens the holding circuit for relay N which at armature *n*2 again connects up the timing circuits and the two systems start the next cycle in phase. If the cycle times are now approximately the same, although relay RSF may again operate first, the pause thereby introduced in the master timer operation will be sufficient to enable the existing system to catch up. The operation of relay OSR at the same time as relay RSF completes a quick step circuit for the timer over armatures *rsf*3 and *osr*4 by way of the comparatively low resistance, 26, which terminates the pause and accordingly the two systems again start off in phase.

Preferably the arrangements will be such that the new system will normally run slightly ahead of the existing system, that is, in general the new system will operate on a slightly shorter cycle than the existing system and an adequate pause will be provided by the introduction of resistance 25 by relay RSF at the end of the cycle to cover slight discrepancies in the timing and enable both systems to start their cycles simultaneously.

If the cycle time of the existing system is reduced as might be found desirable owing to a change in traffic conditions, relay OSR will operate before relay RSF and in turn operate relay OSF over armatures *osr*1, *th*3, and *rsf*4. Relay OSF at armature *osf*1 completes a self interrupting circuit for the slow relay IR which interrupts the circuit of the driving magnet DM to drive the wipers of the master timer switch automatically to the phasing position independent of the timing circuit. In the phasing position for wiper MT1 grounded lead 18 is connected over the "decrease" lead and armature *v*3 in the energized position of relay V, to energize relay W in series with the second winding of relay V, and in the phasing position for wiper MT2 relay CO operates and at armatures *co*2 and *co*3 breaks the automatic drive circuit to the master timer switch. Relay W, on operating, at armature *w*1 opens the energizing circuit of the first or pull-in winding of relay V. Relay V however remains energized over its second winding in series with relay W. Relays V and W release when the wiper on bank MT1 leaves its phasing position contact, whereupon at armature *v*2 resistance 28 is eliminated from the charging circuit to speed up the operation of the master timer.

Alternatively, if the cycle time of the existing system is lengthened, the pause introduced in the master timer operation by the operation of relay RSF will not now be adequate to enable the existing system to catch up and accordingly relays A and N operate to cause additional resistance to be included in the charging circuit of the master timer as already explained.

If the existing system is switched out of service, the thermostat relay TH is de-energized and in this case, as a result of the intermittent operation of relay A, the resistance controlling relays such as S and V are released one after the other by the application of pulses from grounded lead 18 over armatures *osr*5 and *th*2 in the de-energized positions of those relays and over armatures *ra*2 and *s*3 to the "decrease" lead to restore the master timer to its quick cycle time according to the manner described above. When all control relays are released, the circuit to the "decrease" lead is opened at armature *s*3.

Although only two sets of resistance controlling relays have been shown, it will be appreciated that any desired number may be provided depending upon the range of variation in the cycle time it is intended to cover. It will be understood that the contact marked *y*3 is carried by a relay of the next set and the dotted connections indicate the wiring for the last set.

Alternatively, the resistance controlling relays may be replaced by a rotary step-by-step switch similar to the master timer switch but provided with the two driving magnets connected respectively to the "increase" and "decrease" leads, and arranged to move the wipers forwardly and backwardly over the bank contacts to effect the required resistance changes in the charging circuit. A suitable construction is disclosed in Fig. 3 which like Fig. 2 should be considered in conjunction with Fig. 1.

In Fig. 3 the rotary stepping switch DDT is of a type provided with two stepping mechanisms and is so adapted that the wiper arms may be operated over their respective contact banks in either direction. Energization and de-energization of magnet DEM, by an impulse over the "decrease" lead, will cause wipers 50 and 60 to move one step clockwise, reducing the effective portion of resistance 51 in the charging circuit of the master timer. Similarly an impulse on the "increase" lead momentarily energizes magnet INM which rotates wipers 50 and 60 one step counterclockwise, thereby increasing the effective portion of the resistance 51 in the timing circuit. Principles of construction of a stepping switch of this type are indicated in Figures 4 and 5. Magnet DEM is arranged to notch in one direction the ratchet wheel 52, mounted on shaft 53, and magnet INM is similarly fixed to notch ratchet wheel 54 on shaft 55 in the opposite direction of rotation to shaft 53. The differential gearing permits member 56 to revolve in either direction. Wipers 50 and 60 are mounted on member 56 and are suitably shaped to revolve over their respective banks of contacts of the switch DDT either clockwise or counterclockwise. The contacts of switch bank DDT1, Figure 3, are connected to points which may preferably be equidistant on rheostat 51. When wiper 50 is engaging the contact where all resistance 51 is cut out of the charging circuit making further impulses over the "decrease" lead ineffective, wiper 60 on bank DDT2 connects power to energize relay F, which at armature f1 breaks circuit to decrease magnet DEM so that further pulses over the "decrease" lead are ineffective. Similarly when wiper 50 is engaging the contact at the other end of bank DDT1, connection is made over wiper 60 on bank DDT2 to energize relay G which attracts its armature g1 breaking circuit over the "increase" lead to increase magnet INM.

A further alternative shown in Fig. 6 makes use of a pair of rotary step-by-step switches each moving always in the same direction and so interconnected and arranged that the movement of one switch adds resistance to the charging circuit while the movement of the other switch takes it out. These switches are designated A and B in the drawings and their driving magnets are connected respectively with the "decrease" and "increase" leads extending from the cycle controlling relays of Figure 1. Conveniently the contacts in the banks A1 and B1 connect with the tapping points on the common resistance 65 shown, while the wipers connect with the leads L1 and L2 leading to the timing circuit. It will therefore be clear that impulses over the "decrease" lead momentarily energize "decrease" switch magnet ADM which effects movement of the decrease switch A to remove resistance while impulses over the "increase" lead momentarily energize increase switch magnet BDM which effects movement of the increase switch B to add resistance. When the wipers of the two switches stand on corresponding contacts a direct connection is established between them on banks A1 and B1 and no part of the common resistance 65 is included in the charging circuit.

To avoid error in the amount of resistance included in the circuit when the wipers of the increase switch B step from the last contact to the first the following arrangements are provided. Relay D is energized by a circuit from lead 18 over the first contact of bank B2, lead 66 to lead 19 and locks over armature d1 and at armature d2 energizes the slow relay C in a circuit including interrupter springs adm1 and bdm1 of driving magnets ADM and BDM connected in parallel. Relay C at armatures c1 and c2 thereupon energizes the magnets over leads 67 and 68 respectively and when both sets of interrupter springs open, proving that each magnet has become energized, relay C releases and disconnects the magnets whereupon the wipers are advanced on to the next set of contacts. This action continues automatically and the wipers of both switches are therefore stepped in synchronism until the wipers of the decrease switch A come into their first position, where relay E operates over the wiper on bank A2. Relay E at armature e1 opens the lock-in circuit of relay D and at armature e2 opens the circuit to relay C. Both sets of wipers however retain the same relative position so that the correct amount of resistance is included in the charging circuit when they come to rest.

When the existing system is switched out of service and the thermostat relay TH releases, pulses are applied over the "decrease" lead as explained to restore the master timer to its quick cycle time. The wipers of the decrease switch A therefore are stepped ahead and when they come into a position corresponding to those of the increase switch B all of resistance 65 is eliminated from the charging circuit and a stop relay STP is operated over wipers on banks A3 and B3 and the armature th6 in the de-energized position of relay TH. The stop relay at armature stp1 opens the stepping circuit to the decrease magnet ADM so that further pulses over the "decrease" lead during this condition are without effect. Relay STP may also be energized by a circuit completed over the wiper on bank B2 in its last position, lead 69 and armature e3 in its energized position. Thus it will be seen that by this circuit relay STP is energized when all of resistance 65 is included in the charging circuit between leads L1 and L2, rendering further impulses on the "increase" lead ineffective, since armature stp2 opens circuit to the increase magnet BDM.

Obviously the stepping switches A and B may have banks containing any number of contacts, preferably sufficient to provide ample range of variation in the cycle time it is intended to cover.

Summarizing, it will be noted that according to the invention there is provided among other features, a system and apparatus for maintaining the timer of one traffic signal control system (which may be a new or newly established system) substantially in synchronism with the time cycle of a second traffic signal control system (which may be an old or existing system for example), for resynchronizing the first system with the second periodically, as once in every cycle of signal indications whether the first system has a shorter or longer time cycle than the second system, for automatically adjusting the time cycle of the first system to correspond with the time cycle of the second system whether the second system has a substantially constant time cycle or varies considerably and whether it has a shorter or longer time cycle than the first. Additional apparatus is provided for automatically releasing the first system from such control by the second as above described whenever the second system ceases operation, such apparatus providing the further feature of automatically speeding up the operation of the first system upon such release from control by the second.

It will be understood that the new system may if desired include arrangements whereby the various intersections of the new system are separately vehicle-controlled in times of light traffic for instance as described in the co-pending United States application of Percy Bailey Renshaw, Serial Number 677,029 aforesaid.

It is to be understood that the several alternate forms of the invention described herein for achieving the objects specifically brought out above, and others, are to be considered illustrative only, and further that various modifications in the structural details or arrangements of the parts, or changes in the designs herein exemplified may be made without departing from the spirit of the invention as defined by the claims.

Having described my invention what I claim as new and desire to secure by Letters Patent of the United States is:

1. A synchronizing system for primary and secondary cyclically operating timers, including a first relay, means in said primary timer for energizing said first relay at a predetermined point in the primary timer cycle, a second relay, means in said secondary timer for energizing said second relay at a certain point in the secondary timer cycle, a normal operating circuit for said secondary timer, said circuit including a back contact operated by said second relay whereby normal operation of said secondary timer is interrupted at said certain point, and an auxiliary circuit including a make contact on said first relay and a make contact operated by said second relay for operating said secondary timer at said certain point when said primary timer reaches said predetermined point after said secondary timer reaches said certain point.

2. A synchronizing system for primary and secondary cyclically operating timers, including a first relay, means in said primary timer for energizing said first relay at a predetermined point in the primary timer cycle, a second relay, means in said secondary timer for energizing said second relay at a certain point in the secondary timer cycle, relay means having an operating circuit including back contacts on said first relay for operating said relay means substantially at said certain point in the secondary time cycle if said first relay has not yet operated, operating circuit for said secondary timer, said latter circuit including a back contact operated by said relay means whereby operation of said secondary timer is interrupted at substantially said certain point, when said secondary timer reaches said certain point and operates said relay means before said primary timer reaches its predetermined point, and continues interrupted until said first relay is operated to interrupt the operating circuit of said relay means and reestablish said secondary timer operating circuit when said primary timer reaches said predetermined point after said secondary timer reaches said certain point, and means operated by energization of said relay means to increase the length of the next cycle of said secondary timer.

3. A synchronizing system for a primary cyclically operating timer and a secondary timer, said secondary timer comprising a cyclic rotary stepping switch and an impulse generator producing periodic impulses for operating said stepping switch step by step through its cycle, said system including interlinking means for said timers operating when said secondary timer completes its cycle before said primary timer for interrupting operation of said impulse generator until said primary timer completes its cycle, and further means operating when such interruption exceeds a predetermined time period to reduce the periodic frequency of the impulses of said impulse generator during the next subsequent cycle of said stepping switch in said secondary timer.

4. A synchronizing system for primary and secondary cyclically operating timers, said secondary timer comprising a cyclic rotary stepping switch and an impulse generator for normally advancing said stepping switch by impulses step by step through its cycle, said system including rapid driving means for said stepping switch for advancing, when operable, said stepping switch through its cycle more rapidly than such normal advancing by said impulse generator, interlinking means operating when said primary timer completes its cycle before said secondary timer for rendering said rapid driving means operable until said secondary timer completes its cycle, whereby both timers will start their next cycles substantially in synchronism.

5. A synchronizing system for two cyclically operating timers, one of the timers including a cyclic rotary stepping switch and a timing device normally operating to advance said stepping switch step by step through its cycle, means including a variable resistance in said timing device for varying its time period, said system including interlinking means for the timers operable when said one timer completes its cycle before the second of said timers for interrupting operation of said timing device and maintaining such interruption only until said second timer completes its cycle, and further means operating in the event that said interruption exceeds a predetermined period to vary said resistance to increase the time period of said timing device.

6. A synchronizing system as in claim 5 wherein the last named means varies said resistance by a predetermined unit quantity each time that it so operates.

7. A synchronizing system for primary and secondary cyclically operating timers, said secondary timer comprising a cyclic rotary stepping switch and an electrical timing circuit for operating said stepping switch step by step through its cycle, and a variable resistance in said timing circuit for varying the time period of stepping said switch, said system including a first relay, means in said primary timer for energizing said first relay in a predetermined position in its cycle, a second relay, means in said secondary timer for energizing said second relay in a certain position in the cycle of said secondary timer, means including contacts operated by said first and second relays and operating when said first relay is operated before said second relay to vary said resistance by a unit amount to decrease correspondingly the time period of stepping of said switch, means including contacts operated by said relays and operating when said second relay is operated before said first relay to vary said resistance by a unit amount to increase correspondingly the time period of stepping of said switch, and means cooperating with the first resistance varying means to step said switch very rapidly to the said certain position when said first resistance varying means operates to start both timers substantially simultaneously in their next cycle.

8. A synchronizing system for primary and secondary cyclically operating timers, including interlinking means for said timers operating to decrease the time cycle of said secondary timer in the event that said primary timer completes its time cycle before the secondary timer, further interlinking means operating to increase the time cycle of said secondary timer in the event said secondary timer completes its cycle before said primary timer, a time delay relay having an operated condition and an unoperated condition, means operated by said primary timer for periodically energizing and deenergizing said relay, said relay having a time delay period greater than the time between such periodic energizations to maintain said relay in operated condition as long as said periodic energizations occur at time intervals within said time delay period, and means including contacts operated by said relay interposed in said interlinking means to maintain the recited operation of said interlinking means while said relay is in its operated condition and to interrupt such recited operation of said interlinking means when said relay assumes its unoperated position in the event of failure of said periodic energizations, whereby said secondary timer will be rendered independent of such interlinking with said primary timer in the event of failure of said primary timer.

9. A synchronizing system for primary and secondary cyclically operating timers, including an operating circuit for said secondary timer having a resistance for controlling its time cycle, a pair of cyclic rotary step-by-step switches each having a plurality of contact positions and a plurality of contacts corresponding to such positions and connected to said resistance so as to include a portion of said resistance in said operating circuit in the event that said rotary switches are operating contacts in different or non-corresponding contact positions, the portion of resistance so included being substantially proportionate to the number of positions that the operated contacts of one switch are spaced from the operated contacts of the other switch, and means for operating one of said rotary switches one step in the event that said primary timer completes its cycle before said secondary timer, and means for operating the other of said switches one step in the event that said secondary timer completes its cycle before said primary timer, each of said switches operating a different one of its contacts at each successive step whereby the cycle of said secondary timer will be varied in accordance with the amount of resistance included between the operated contacts of the respective switches.

10. A synchronizing system for primary and secondary cyclically operating timers, an operating circuit for said secondary timer, means including a variable resistance in said operating circuit for varying the length of the secondary timer cycle, interlinking means including a rotary stepping switch having a plurality of contact positions, contacts corresponding to said positions and connected to a plurality of corresponding points on said variable resistance, a wiper arm on said switch engageable with said contacts and rotatable in either of two directions, for including a greater amount of resistance in said timing circuit when rotated in one direction for increasing the next time cycle of said secondary timer and for including a lesser amount of resistance in said circuit when rotated in the other direction for decreasing such next time cycle of said secondary timer, means operable when said secondary timer completes its cycle before said primary timer to cause the wiper arm of said switch to move one step in said one direction and means operable when said secondary timer completes its cycle after said primary timer to cause the wiper arm to move one step in said other direction, whereby the next cycle of said secondary timer is varied in length to approach the cycle of said primary timer, means cooperating with the first switch moving means to interrupt said secondary timer operating circuit when said first switch moving means operates, and means for completing said operating circuit again when said primary timer completes its cycle, to start both timers substantially simultaneously in their next cycle.

11. In a synchronizing system for cyclically operating primary and secondary timers, said secondary timer comprised of a cyclic rotary stepping switch and an impulse generator operable to generate periodic impulses for advancing said stepping switch step by step through its cycle, interlinking means associated with said timers and said impulse generator of said secondary timer and functioning to increase or decrease the rate of impulsing of said impulse generator for making the cycle of said secondary timer approach in length the cycle of said primary timer, and means operable in the event of and while said primary timer ceases its cyclic operation to cause said impulse generator to increase its impulsing rate to a maximum and operate at said maximum rate.

12. A synchronizing system for cyclically operating primary and secondary timers, including an operating circuit for said secondary timer, a variable resistance in said operating circuit for varying the length of the secondary timer cycle, a first relay, means in said primary timer for energizing said first relay at a predetermined point in its cycle, a second relay, means in said secondary timer for energizing said second relay in a certain part of the cycle of said secondary timer, a circuit including a third relay and a back contact on a fourth relay for energizing said third relay in the event that said first relay is operated after said second relay in one cycle of operation of said timers, and maintaining said third relay energized during the next cycle of operation of said timers, means operated by said third relay to increase the amount of resistance in said timing circuit, and a circuit for energizing said fourth relay in the event that said second relay is operated after said first relay in said next cycle of operation of said timers, whereby said third relay is deenergized and the amount of resistance in said operating circuit is reduced.

13. A synchronizing system for cyclically operating primary and secondary timers, each of said timers having a starting point in its cycle, said system including an operating circuit for said secondary timer, a variable resistance in said operating circuit for varying the length of the secondary timer cycle, means operating in the event that said secondary timer completes its cycle before said primary timer to interrupt operation of said secondary timer until said primary timer completes its cycle, further means operating in such event to vary the amount of said resistance in said operating circuit to increase the length of the next cycle of said secondary timer, rapid drive means operating in the event that said primary timer completes its cycle before said secondary timer to operate said secondary timer to its cycle starting point rapidly and independent of said operating circuit, and further means operating in the event that said primary timer completes its cycle before said secondary timer to vary the amount of resistance in said operating circuit to decrease the length of the next cycle of said secondary timer.

THOMAS PHILIP PREIST.